US008982787B2

(12) United States Patent
Kim et al.

(10) Patent No.: US 8,982,787 B2
(45) Date of Patent: Mar. 17, 2015

(54) METHOD AND APPARATUS FOR CONNECTING TO NETWORK FROM MOBILE TERMINAL

(75) Inventors: Hong Kim, Seoul (KR); Kwang Jin Park, Suwon-si (KR); Jin Soo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 13/246,348

(22) Filed: Sep. 27, 2011

(65) Prior Publication Data

US 2012/0076076 A1 Mar. 29, 2012

(30) Foreign Application Priority Data

Sep. 27, 2010 (KR) ........................ 10-2010-0092977

(51) Int. Cl.
*H04W 4/00* (2009.01)
*H04W 76/02* (2009.01)
*H04W 8/22* (2009.01)
*H04W 80/00* (2009.01)

(52) U.S. Cl.
CPC .............. *H04W 76/02* (2013.01); *H04W 8/22* (2013.01); *H04W 80/00* (2013.01)
USPC ........................................................ 370/328

(58) Field of Classification Search
CPC .............................. H04W 76/02; H04W 76/00
USPC ........................................................ 370/328
See application file for complete search history.

(56) References Cited

U.S. PATENT DOCUMENTS

2003/0108027 A1* 6/2003 Kim et al. ...................... 370/345
2007/0287476 A1* 12/2007 Jeong et al. ................. 455/456.6

OTHER PUBLICATIONS

ETSI TS 125 331 V8.8.0, "Universal Mobile Telecommunications System (UMTS); Radio Resource Control (RRC); Protocol Specification", Oct. 2009, 3GPP, all pages.*
Ericsson, "Specification of RCC procedure: RCC connection establishment", TSG-RAN, Aug. 1999, all pages.*
Ericsson, "Proposed changes to the RRC protocol specificatio regarding RRC connection establishment and re-establishment procedures", TSG-RAN, May 1999, all pages.*
ETSI TS 125 331 "Universal Mobile Telecommunications System (UMTS); Radio Resource Control (RRC); Protocol specification (3GPP TS 25.331 version 8.12.0 Release 8)", Oct. 2010, V8.12.0.

* cited by examiner

*Primary Examiner* — Kwang B Yao
*Assistant Examiner* — Adam Duda
(74) *Attorney, Agent, or Firm* — Jefferson IP Law, LLP

(57) ABSTRACT

A method for connecting to a network from a mobile terminal capable of forming a high-performance radio channel in a Universal Mobile Telecommunication System (UMTS), and an apparatus implementing the same are provided. The method includes transmitting a Radio Resource Control (RRC) connection request message indicating a first release version to the network, receiving an RRC connection setup message indicating a second release version from the network, comparing the first and second release versions, determining whether there is a third release version lower than the first release version and higher than the second release version when the second release version differs from the first, and, if there is the third release version lower than the first release version and higher than the second release version, transmitting an RRC connection request message indicating the third release version to the network when the second release version differs from the first release version.

12 Claims, 6 Drawing Sheets

METHOD AND APPARATUS FOR CONNECTING TO NETWORK FROM MOBILE TERMINAL

PRIORITY

This application claims the benefit under 35 U.S.C. §119(a) of a Korean patent application filed on Sep. 27, 2010 in the Korean Intellectual Property Office and assigned Serial No. 10-2010-0092977, the entire disclosure of which is hereby incorporated by reference.

BACKGROUND OF THE INVENTION

1. Field of the Invention

The present invention relates to a method and an apparatus for connecting to a network from a mobile terminal. More particularly, the present invention relates to a method for connecting to a network from a mobile terminal capable of forming a high-performance radio channel in a Universal Mobile Telecommunication System (UMTS), and an apparatus implementing the same.

2. Description of the Related Art

UMTS, which is an updated system based on the Global System for Mobile Communications (GSM) European standard, is a third generation mobile communication system that aims to provide an improved mobile communication service based on a combination of a GSM core Network and a Wideband Code Division Multiple Access (WCDMA) network.

A User Equipment (UE), which includes a user terminal in the UMTS, forms a radio channel with a network through a network connection procedure. In the network connection procedure, the UE transfers a currently supportable release version to the network. Accordingly, the network determines and transfers a release version of a radio channel to be allotted to the UE, and the UE forms the radio channel with the network using the received release version. However, when the network does not support the release version provided from the UE, the network optionally determines and transfers the release version to the UE with the result that the UE may use the release version determined in the network. In this case, there arises a problem in that a suitable radio channel between the UE and the network cannot be formed using release versions supported by the UE.

SUMMARY OF THE INVENTION

Aspects of the present invention are to address at least the above-mentioned problems and/or disadvantages and to provide at least the advantages described below. Accordingly, an aspect of the present invention is to provide a method for connecting to a network from a mobile terminal and for forming a radio channel suitable for a release version that the mobile terminal may support, and an apparatus implementing the same.

In accordance with an aspect of the present invention, a method for connecting to a network from a mobile terminal is provided. The method includes transmitting a Radio Resource Control (RRC) connection request message indicating a first release version to the network, receiving an RRC connection setup message indicating a second release version from the network, comparing the second release version with the first release version, determining whether there is a third release version lower than the first release version and higher than the second release version when the second release version differs from the first release version, and, if there is the third release version lower than the first release version and higher than the second release version, transmitting an RRC connection request message indicating the third release version to the network when the second release version differs from the first release version.

In accordance with another aspect of the present invention, a mobile terminal is provided. The terminal includes a message transceiver for transmitting an RRC connection request message and an RRC connection setup complete message to a network, and for receiving an RRC connection setup message from the network, a message generator for adding a release version to generate an RRC connection request message or an RRC connection setup complete message, and a controller for comparing a first release version included in the RRC connection setup message transmitted to the network with a second release version included in the RRC connection request message received from the network, for controlling the message generator to add a third release version that is lower than the second release version and higher than the first release version and generating an RRC connection request message by including the third release version when the second release version differs from the first release version, and for controlling the message transceiver to transmit the generated RRC connection request message to the network.

In accordance with yet another aspect of the present invention, a method for connecting to a network from a mobile terminal is provided. The method includes transmitting an RRC connection request message indicating a first release version to the network, receiving an RRC connection setup message indicating a second release version from the network, comparing the second release version with the first release version, and transmitting an RRC connection setup complete message to the network.

Exemplary embodiments of the present invention may form a radio channel between a mobile terminal and a network suitable for a release version that the mobile terminal may support. Because a higher-performance radio channel is formed between a mobile terminal and a network in comparison with the related art, the performance of communication between the mobile terminal and the network may be improved.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
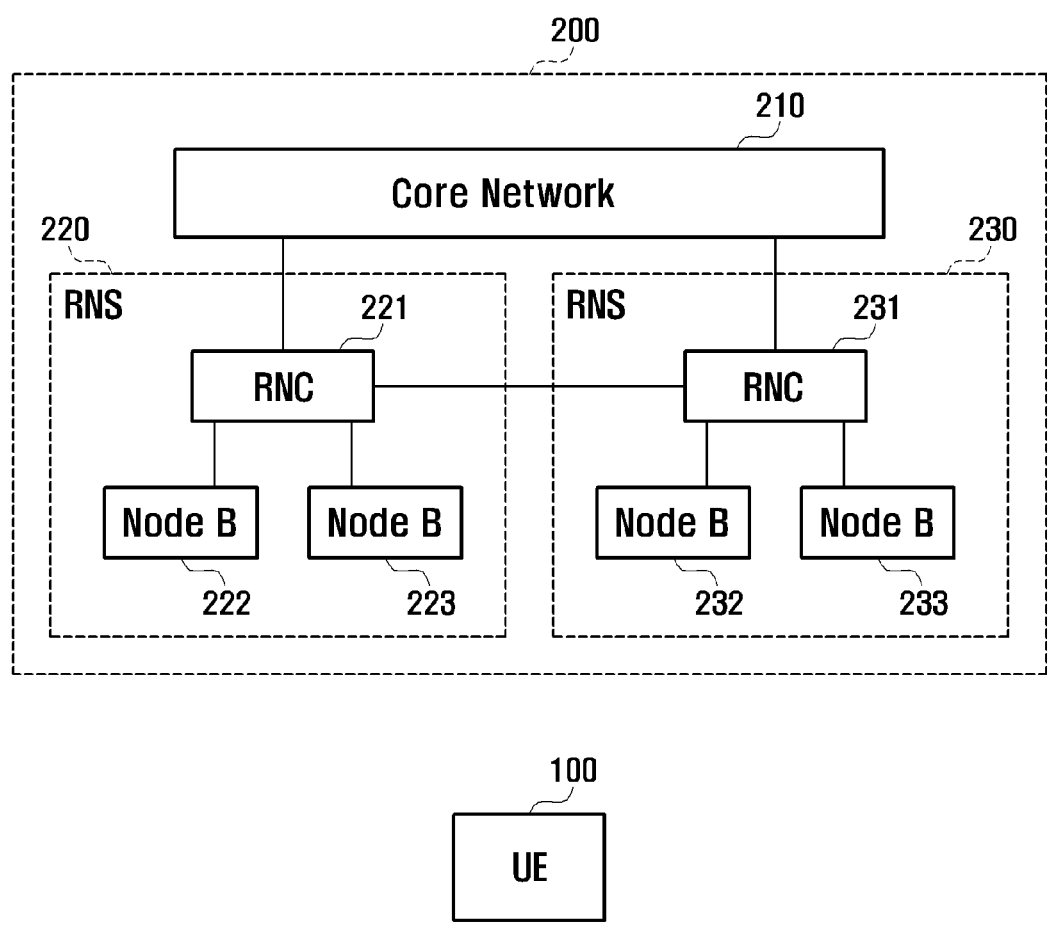
FIG. 1 is a block diagram illustrating a configuration of a mobile communication system according to an exemplary embodiment of the present invention.

FIG. 1 is a block diagram illustrating a configuration of a mobile communication system according to an exemplary embodiment of the present invention.

The mobile communication system may be configured as a Universal Mobile Telecommunication System (UMTS) of the 3rd Generation Partnership Project (3GPP).

Referring to FIG. 1, the mobile communication system includes a User Equipment (UE) 100 and a network 200. The network 200 includes a core network 210 and a plurality of Radio Network Subsystems (RNSs) 220 and 230.

The plurality of RNSs 220 and 230 are configured as UMTS Terrestrial Radio Access Networks (UTRANs). The core network 210 may include a Mobile Switching Center (MSC) and a Visitor Location Register (VLR) for connecting the UTRANs to a circuit network such as during the reception or transmission of a call. The network 210 may also include a Serving General Packet Radio Service (GPRS) Support Node (SGSN) and a Gateway GPRS Support Node (GGSN) for connecting the UTRANs to a packet data network such as the Internet.

The RNSs 220 and 230 include Radio Network Controllers (RNCs) 221 and 231, and a plurality of Nodes B 222, 223 and 232, 233, respectively. The RNS 220 includes a Radio Network Controller (RNC) 221 and a plurality of Nodes B 222 and 223. The RNS 230 includes an RNC 231 and a plurality of Nodes B 232 and 233.

The RNC 221 or 231 may be classified into a Serving RNC, a Drift RNC, and a control RNC according to its function. The serving RNC manages information of the UE 100 and processes calls with the core network 210 and transmission of packet data. The drift RNC directly accesses the UE 100 in a radio scheme. The control RNC controls a radio resource of the Nodes B 222, 223, 232, and 233.

Each of the RNC 221 or 231 allots a radio resource for the Nodes B 222, 223, 232, and 233 that it manages. The Nodes B 222, 223, 232, and 233 relay provided radio resources allotted from the RNC 221 or 231 to the UE 100. According to exemplary embodiments of the present invention, the radio resources are configured by cells. The radio resources provided from the Nodes B 222, 223, 232, and 233 correspond to a radio resource for a cell managed by a corresponding Node B. The UE 100 sets a radio channel using the radio resources provided from the Nodes B 222, 223, 232, and 233, and transmits and receives a call or data through the set radio channel.

The UE 100 performs a Radio Resource Control (RRC) Connection Procedure for a circuit service call or a packet service session. If a channel is formed between the UE 100 and the RNSs 220 and 230 through the RRC Connection Procedure, the UE 100 performs communication with the RNSs 220 and 230 through the channel. More particularly, the UE 100 sets a radio bearer with the RNSs for transmitting and receiving packet data, and transmits and receives the packet data through the set radio bearer.

Hereinafter, an exemplary configuration of a UE will be described.

Figure 2:
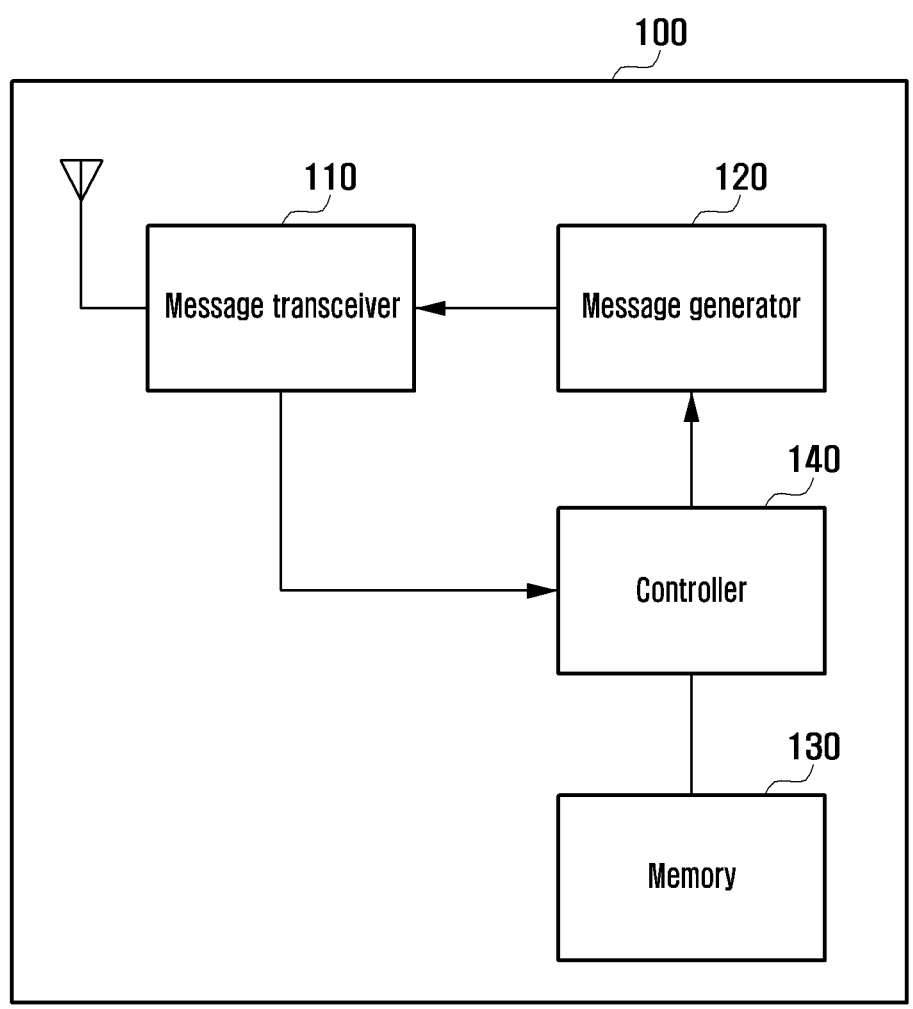
FIG. 2 is a block diagram illustrating a configuration of a User Equipment (UE) according to an exemplary embodiment of the present invention.

FIG. 2 is a block diagram illustrating a configuration of a UE according to an exemplary embodiment of the present invention.

Referring to FIG. 2, the UE 100 includes a message transceiver 110, a message generator 120, a memory 130, and a controller 140.

The message transceiver 110 executes transmitting and receiving functions of corresponding data for radio communication of the UE 100. The message transceiver 110 may include an RF transmitter for up-converting a frequency of a transmitted signal and amplifying the signal, and an RF receiver for low-noise-amplifying a received signal and down-converting the signal. Further, the message transceiver 110 may receive data through the radio channel and output the data to the controller 140. The message transceiver 110 may transmit data received from the controller 140 through the radio channel. The message transceiver 110 performs radio communication with a network. The message transceiver 110 transmits an RRC Connection Request message to the network in the RRC connection procedure. If the message transceiver 110 receives an RRC Connection Setup message, it transmits an RRC Connection Setup Complete message to the network.

The message generator 120 generates messages to be transmitted to the network under the control of the controller 140. The message generator 120 generates the RRC Connection Request message and the RRC Connection Setup Complete message. The message generator 120 generates the RRC Connection Request message and the RRC Connection Setup Complete message by adding a supportable release version that the UE may support.

The memory 130 stores programs and data necessary for an operation of the UE 100. The memory 130 may be divided into a program area and a data area. The memory 130 may be configured by a volatile storing medium, a nonvolatile storing medium, or a combination thereof. The volatile storing medium includes a semiconductor memory such as a Random Access Memory (RAM), a Dynamic RAM (DRAM), or a Static RAM (SRAM). The nonvolatile storing medium may include a hard disk. In an exemplary implementation, the memory 130 stores information regarding a 3 GPP release version that the UE 100 may support.

The controller 140 controls an overall operation of respective elements of the UE 100. For example, the controller 140 controls the message generator 120 to add information regarding a release version that the UE 100 may support, thereby generating an RRC connection request message. The controller 140 controls the message transceiver 110 to transmit the generated RRC connection request message to the network. If the controller 140 receives an RRC connection setup message containing a release version of a channel to be allotted from the network through the message transceiver 110, it compares a release version in the RRC connection request message with that included in the RRC connection setup message. When it is determined that the release version in the RRC connection request message differs from that included in the RRC connection setup message, the controller 140 controls the message generator 120 to add a release version between the release version in the RRC connection request message and the release version included in the RRC connection setup message, thereby generating the RRC connection request message, and controls the message transceiver 110 to transmit the RRC connection request message to the network. If the controller 140 receives an RRC connection setup message included in a release version from the network through the message transceiver 110, it compares the release version included in the RRC connection request message with that included in the RRC connection setup message. When it is determined that the release version included in the RRC connection request message is identical with that included in the RRC connection setup message, the controller 140 controls the message generator 120 to generate an RRC connection setup complete message containing a release version included in the RRC connection request message, and controls the message transceiver 110 to transmit the RRC connection setup complete message to the network. If the network receives the RRC connection setup complete message from the UE 100, a radio channel is formed between the UE 100 and the network.

In an exemplary embodiment of the present invention, if the controller 140 receives an RRC connection setup message containing a release version of a channel to be allotted from the network through the message transceiver 110, it controls the message generator 120 may add a release version included in the RRC connection setup message, thereby generating an RRC connection setup complete message, and controls the message transceiver 110 to transmit the RRC connection setup complete message to the network. In a state that a radio channel is formed between the UE 100 and the network, the controller 140 compares a release version included in an RRC connection setup message with that included in the RRC connection request message. When the release version included in an RRC connection setup message differs from that included in the RRC connection request message, the controller 140 controls the message generator 120 to add a release version between the release version included in the RRC connection request message and the release version included in the RRC connection setup message, thereby generating an RRC connection request message, and controls the message transceiver 110 to transmit the RRC connection request message.

In an exemplary embodiment of the present invention, the controller 140 compares a release version included in an RRC connection setup message with that included in an RRC connection request message. When the release version included in an RRC connection setup message differs from that included in an RRC connection request message, the controller 140 may determine whether intermediate release versions exist between the release version included in the RRC connection request message and the release version included in the RRC connection setup message. When the intermediate release versions do not exist between the release version included in the RRC connection request message and the release version included in the RRC connection setup message, the controller 140 may control the message generator 120 to add a release version included in the RRC connection setup message, thereby generating an RRC connection setup complete message, and control the message transceiver 110 to transmit the RRC connection setup complete message to the network.

In an exemplary embodiment of the present invention, when the intermediate release versions do not exist between the release version included in the RRC connection request message and the release version included in the RRC connection setup message, the controller 140 may control the message transceiver 110 to transmit a firstly generated RRC connection request message to the network.

In an exemplary embodiment of the present invention, when the intermediate release versions exist between the release version included in the RRC connection request message and the release version included in the RRC connection setup message, the controller 140 may determine how many release versions there are. When there is one release version, the controller 140 may control the message generator 120 to add the intermediate release versions, thereby generating an RRC connection request message, and control the message transceiver 110 to transmit the RRC connection request message to the network. When there are a plurality of release versions, the controller 140 may select the highest release version from the intermediate release versions, control the message generator 120 to add the selected release version, thereby generating an RRC connection request message, and control the message transceiver 110 to transmit the RRC connection request message to the network.

The foregoing exemplary description has illustrated a configuration of the UE for performing a connection procedure with a network. Hereinafter, an exemplary method for connecting to a network by a UE will be described.

Figure 3:
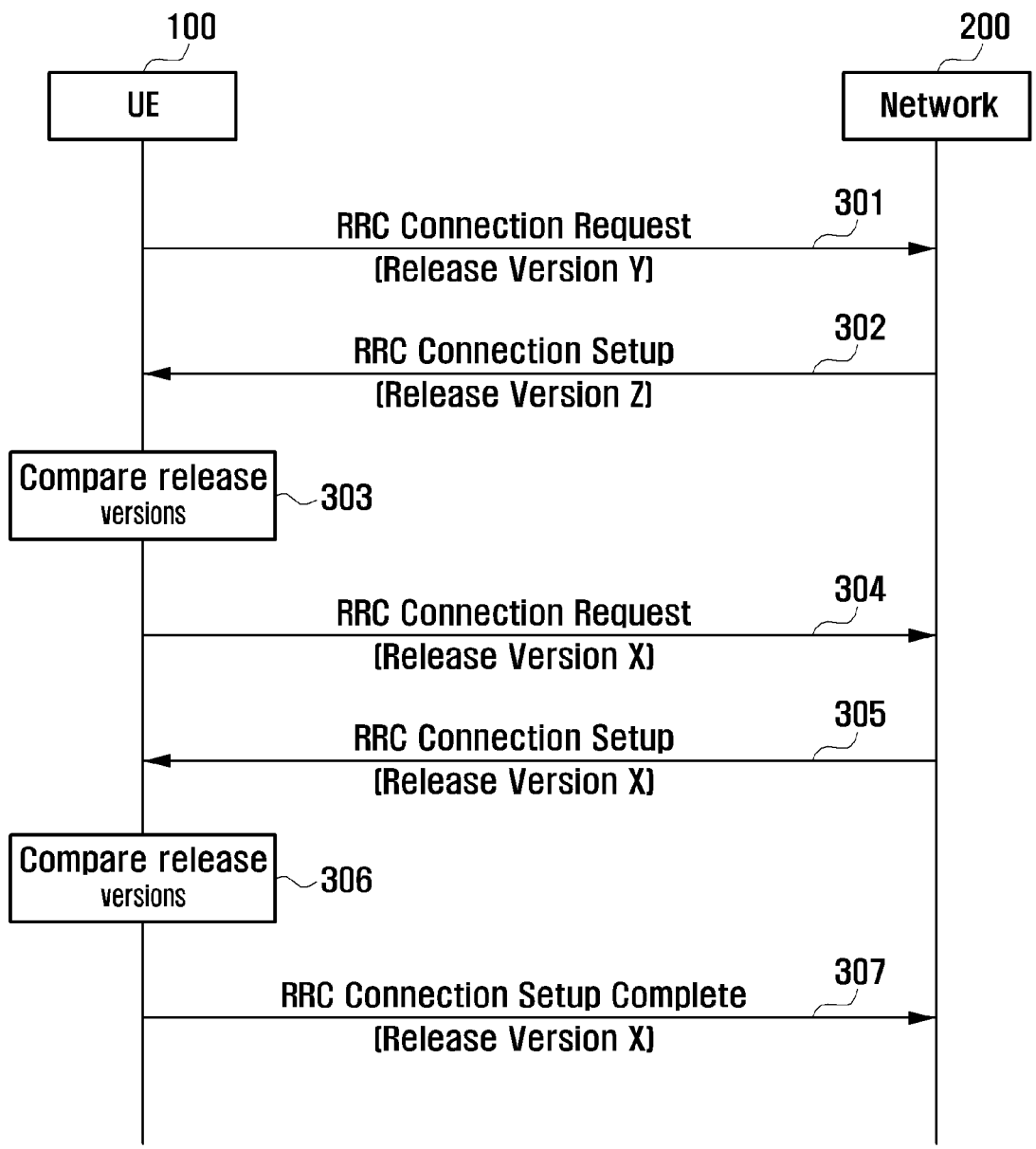
FIG. 3 is a signal flow diagram illustrating a network connecting method achieved by a UE and a network according to a first exemplary embodiment of the present invention.

FIG. 3 is a signal flow diagram illustrating a network connecting method achieved by a UE and a network according to a first exemplary embodiment of the present invention.

Referring to FIG. 3, the UE 100 generates and transmits an RRC Connection Request message with a release version Y to a network 200 in step 301. In an exemplary implementation, the UE 100 stores information regarding one or more supportable release versions in a memory. When the RRC connection request message is generated, supportable release versions as listed in the following table are displayed as a parameter to generate an RRC connection request message. The 3GPP defines a communication standard according to a release version. If the UE 100 requests network connection using one release version, the network 200 determines a release version in the UE 100 to allot a channel to the UE 100. Table 1 is a table illustrating only items regarding release versions among information included in the RRC connection request message.

TABLE 1

| Information Element/ Group name | need | Multi | Type and reference | Semantics description | Version |
|---|---|---|---|---|---|
| Access Stratum Release | MP | | Enumerated (REL-4. REL-5. | Absence of the IE implies R99. The IE also indicates | REL-4 REL-5 REL-6 |

TABLE 1-continued

| Information Element/ Group name | need | Multi | Type and reference | Semantics description | Version |
|---|---|---|---|---|---|
| Indicator | | | REL-6. REL-7) | the release of the RRC transfer syntax supported by the UE 12 spare values are needed | REL-7 |

Referring to Table 1, the UE 100 may support release versions REL-4, REL-5, REL-6, and REL-7. In the description of FIG. 3, it is assumed that a 'release version Y' is an 'REL-7'.

The network 200 transmits an RRC connection setup message with a release version Z to the UE 100 in step 302. When the UE 100 requests RRC connection with a release version Y, it is preferred that the network 200 allots a channel of the release version Y to the UE 100. However, when the network 200 does not support the release version Y, it optionally determines and allots a different release version to the UE 100. The network 200 optionally determines a release version Z and transmits an RRC connection setup message with the release version Z to the UE 100. In the description of FIG. 3, it is assumed that a 'release version Z' is an 'REL-5'.

The UE 100 compares a release version included in an RRC connection setup message with that included in an RRC connection request message in step 303. That is, the UE 100 compares a release version Z with a release version Y. If the network 200 transmits an RRC connection setup message with the release version Y to the UE 100, the UE 100 determines that a release version included in an RRC connection setup message is identical with that included in an RRC connection request message. However, if the network 200 transmits an RRC connection setup message with a release version Z lower than the release version Y to the UE 100, the UE 100 determines that the release version included in the RRC connection setup message is lower than that included in the RRC connection request message. Because the 'release version Y' is a 'REL-7', and the 'release version Z' is a 'REL-5' in FIG. 3, the UE 100 determines that the release version included in the RRC connection setup message is lower than that included in the RRC connection request message.

The UE 100 adds a release version X lower than the release version Y and higher than the release version Z to generate and transfer an RRC connection request message to the network 200 in step 304. It is assumed in FIG. 3 that the network 200 may support the release version X. The UE 100 may determine whether there are release versions lower than the release version Y and higher than the release version Z. If the release version Z is just below the release version Y, the UE 100 determines that there are no release versions lower than the release version Y and higher than the release version Z. In this case, the UE 100 may determine a release version as the release version Z, and generate and transmit an RRC connection setup complete message with the release version Z to the network 200. Meanwhile, if there are no release versions lower than the release version Y and higher than the release version Z, the UE 100 may again transmit an RRC connection request message with the release version Y to the network 200.

If a release version X exists between the release version Y and the release version Z, the UE 100 adds the release version X to generate and transmit an RRC connection request message to the network 200. If there are a plurality of release versions between the release version Y and the release version Z, the UE 100 may select the highest release version from the plurality of release versions, and add the selected release version to generate and transmit an RRC connection request message to the network 200. When the 'release version Y' is a 'REL-7' and the 'release version Z' is a 'REL-5', the UE 100 adds a release version 'REL-6' between a 'REL-7' and a 'REL-5' to generate and transmit an RRC connection request message to the network 200.

The network 200 transmits an RRC connection setup message with the release version X to the UE 100 in step 305. When the network 200 may support a release version requested from the UE 100, it allots a channel corresponding to the release version requested from a user to the UE 100. Because the network 200 may support the release version X requested from the UE 100, it generates and transmits an RRC connection setup message with the release version X to the UE 100 in step 305.

The UE 100 compares release versions included in the RRC connection setup message with those included in the RRC connection request message in step 306. Because the release versions included in the RRC connection request message and release versions included in the RRC connection setup message are the release version X, which are the same value, the UE 100 determines that the release versions have the same value.

The UE 100 generates and transmits an RRC connection setup complete message with the release version X to the network 200 in step 307. Because the UE 100 receives allotment of a channel of the same release version for the requested release version X from the network 200, it transmits an RRC connection setup complete message with the release version X to the network 200 to report termination of the RRC connection procedure thereto. When the RRC connection procedure is terminated, a radio channel according to the release version X is formed between the UE 100 and the network 200, and the UE 100 and the network 200 perform circuit communication and packet data communication on the formed channel.

Conventionally, a UE 100 adds the release version Y to generate and transfer the RRC connection request message to the network 200. If the UE 100 receives an RRC connection setup message with a release version Z, it transmits an RRC connection setup complete message with the release version Z to the network 200 to complete an RRC connection procedure. When the network 200 supports a release version X higher than the release version Z, although the UE 100 may form a channel with the network 200 by the release version X, it forms the channel with the network 200 by the release version Z. In exemplary embodiments of the present invention, the UE 100 compares a release version of an RRC connection setup message with a release version of an RRC connection request message, and sequentially reduces the release version to generate and transmit the RRC connection request message to the network 200, so that the network 200 may form a channel by a maximum supportable release version.

Figure 4:
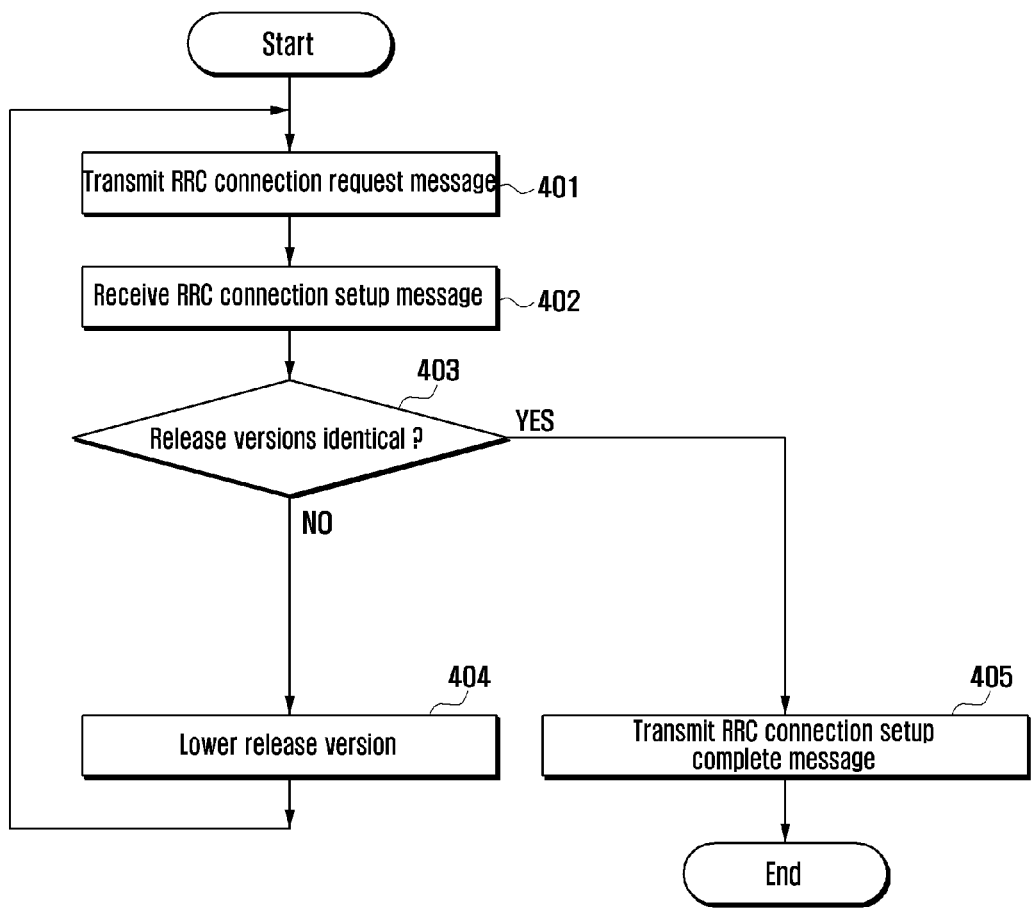
FIG. 4 is a flowchart illustrating a network connecting method achieved by a UE according to the first exemplary embodiment of the present invention.

FIG. 4 is a flowchart illustrating a network connecting method achieved by a UE according to the first exemplary embodiment of the present invention.

Referring to FIG. 4, a controller 140 controls a message transceiver 110 to transmit an RRC connection request message to a network 200 in step 401. A memory 130 of the UE 100 stores information regarding release versions that the UE 100 may support. The controller 140 controls the message generator 120 to add information regarding supportable release versions, thereby generating an RRC connection request message containing the supportable release versions. Next, the controller 140 controls the message transceiver 110 to transmit the generated RRC connection request message to the network 200. It is assumed in FIG. 4 that the UE 100 may support to a release version 'REL-7'. As such, the controller 140 controls the message generator 120 to add information 'REL-7' regarding the release version, thereby generating an RRC connection request message containing the supportable release version, and controls the message transceiver 110 to transmit the generated RRC connection request message.

The controller 140 receives an RRC connection setup message from the network 200 through the message transceiver 110 in step 402 in response to the network 200 receiving the RRC connection request message from the UE 100. When the network 200 may not support release versions included in the RRC connection request message, it optionally determines a release version, and adds the determined release version to generate and transmit an RRC connection setup message to the UE 100. The controller 140 receives the RRC connection setup message through the message transceiver 110 in step 402. It is assumed in FIG. 4 that the network 200 does not support a release version 'REL-7', optionally determines a release version 'REL-5', and adds the release version 'REL-5' to generate and transmit an RRC connection setup message to the UE 100.

The controller 140 determines whether the release versions are identical with each other in step 403. That is, the controller 140 determines whether a release version included in an RRC connection setup message is identical with that included in an RRC connection request message. Since the release version included in the RRC connection request message is 'REL-7' and the release version included in the RRC connection setup message is 'REL-5', the controller 140 determines that the release version included in the RRC connection request message differs from the release version included in the RRC connection setup message.

In an exemplary embodiment of the present invention, the controller 140 may determine whether the release version included in the RRC connection setup message is lower than that included in the RRC connection request message in step 403. Since the release version included in the RRC connection request message is 'REL-7' and the release version included in the RRC connection setup message is 'REL-5', the controller 140 determines that the release version included in the RRC connection setup message is lower than the release version included in the RRC connection request message.

When the release version included in the RRC connection request message differs from the release version included in the RRC connection setup message, the controller 140 lowers the release version in step 404, controls the message generator 120 to generate an RRC connection request message with the reduced release version, and controls the message transceiver 110 to transmit the generated RRC connection request message to the network 200 in step 401. In an exemplary embodiment of the present invention, the controller 140 may reduce the release version by one level. For example, when the controller 140 controls the message generator 120 to generate an RRC connection request message by including 'REL-7', it may reduce the release version to 'REL-6' in step 404, return to step 401, and control the message generator 120 to add 'REL-6', thereby generating an RRC connection request message.

In an exemplary embodiment of the present invention, when it is determined that the release versions are not identical with each other at step 403, the controller 140 may determine whether there are intermediate release versions between a release version included in the RRC connection request message and a release version included in the RRC connection setup message. If there are intermediate release versions, the controller 140 may determine how many intermediate release versions there are. When the release version included in the RRC connection setup message is a release version just below the level of the release version included in the RRC connection request message, the controller 140 determines that there are no intermediate release versions between the release version included in the RRC connection request message and the release version included in the RRC connection setup message.

When there is one intermediate release version between the release version included in the RRC connection request message and the release version included in the RRC connection setup message, the controller 140 reduces a level of the intermediate release version and controls the message generator 120 to add the intermediate release version, thereby generating an RRC connection request message.

When there are a plurality of intermediate release versions between the release version included in the RRC connection request message and the release version included in the RRC connection setup message, the controller 140 reduces a level of the highest release version among the plurality of release versions and controls the message generator 120 to add the release version, thereby generating an RRC connection request message in step 404. The controller 140 may reduce the release version to a level just below the release version included in the RRC connection setup message previously transmitted to the network 200, and control the message generator 120 to add the release version, thereby generating an RRC connection request message in step 404.

In an exemplary implementation, since the release version included in the RRC connection request message is 'REL-7' and the release version included in the RRC connection setup message is 'REL-5', the controller 140 reduces the release version to 'REL-6' in step 404, returns to step 401 and controls the message generator 120 to add the 'REL-6', thereby generating an RRC connection request message, and controls the message transceiver 110 to transmit the generated RRC connection request message to the network 200.

The controller 140 again receives the RRC connection setup message from the network 200 through the message transceiver 110 in step 402. When the network 200 may support the 'REL-6', it generates and transmits an RRC connection setup message with the 'REL-6' to the UE 100. The controller 140 receives the RRC connection setup message from the network 200 through the message transceiver 110.

The controller 140 determines whether a release version included in the RRC connection setup message is identical with that included in an RRC connection request message in step 403. Because both of the release version included in an RRC connection request message and the release version included in an RRC connection setup message are 'REL-6', the controller 140 determines that the release version included in the RRC connection setup message is identical with that included in the RRC connection request message.

If the release versions are identical with each other, the controller 140 controls the message generator 120 to generate an RRC connection setup complete message and controls the message transceiver 110 to transmit the generated RRC connection setup complete message to the network 200 in step 405. In this case, the controller 140 controls the message generator 120 to generate an RRC connection setup complete message with 'REL-6', and controls the message transceiver 110 to transmit the generated RRC connection setup complete message to the network 200. The UE 100 transmits the RRC connection setup complete message to the network 200 to report termination of the RRC connection procedure to the network 200.

Figure 5:
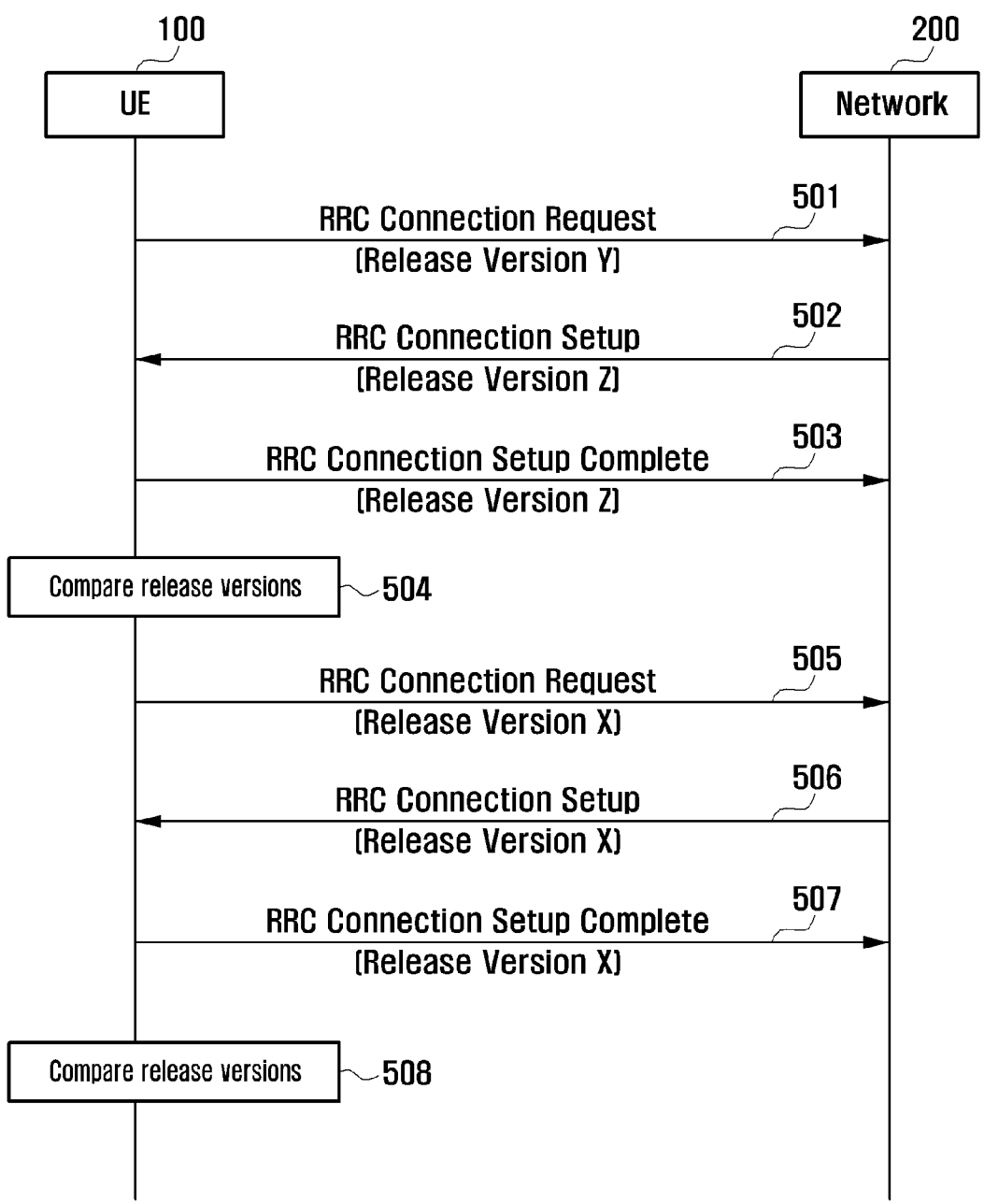
FIG. 5 is a signal flow diagram illustrating a network connecting method achieved by a UE and a network according to a second exemplary embodiment of the present invention.

FIG. 5 is a signal flow diagram illustrating a network connecting method achieved by a UE and a network according to a second exemplary embodiment of the present invention.

Unlike the first exemplary embodiment, the second exemplary embodiment is characterized in that the UE 100 forms a channel according to a release version from the network 200, and compares the release versions with each other, and again performs an RRC connection procedure if a request for a higher release version is possible.

Referring to FIG. 5, step 501 and step 502 have substantially the same functions as step 301 and step 301 of FIG. 3. That is, the UE 100 generates and transmits an RRC connection request message with a release version Y to a network 200 in step 501, and the network 200 transmits an RRC connection setup message with a release version Z to the UE 100 in step 502.

The UE 100 transmits an RRC connection setup complete message with a release version Z to the network 200 in step 503. The UE 100 first terminates an RRC connection procedure according to the release version Z from the network 200. This is because the UE first secures a formed channel according to the release version Z.

The UE 100 compares a release version included in an RRC connection setup message with that included in an RRC connection request message in step 504. Step 504 is substantially the same as step 303 of FIG. 3. When the 'release version Y' is 'REL-7' and the 'release version Z' is 'REL-5', the UE 100 determines that the release version included in the RRC connection setup message is lower than the release version included in the RRC connection request message.

Subsequently, the UE adds a release version X lower than the release version Y and higher than the release version Z to generate and transfer an RRC connection request message to the network 200 in step 505. The network 200 transmits an RRC connection setup message with the release version X to the UE 100 in step 506. Step 505 and step 506 are substantially the same as step 304 and step 305 of FIG. 3, respectively.

The UE 100 transmits an RRC connection setup complete message with the release version X to the network 200 in step 507. A channel of the release version X is formed between the UE 100 and the network 200.

The UE 100 compares a release version included in an RRC connection setup message with a release version included in an RRC connection request message in step 508. When the release version included in the RRC connection setup message is identical with the release version included in the RRC connection request message, the UE 100 maintains a channel formed by the release version X. Subsequently, the UE 100 and the network 200 perform circuit call communication and packet data communication on the formed channel.

Figure 6:
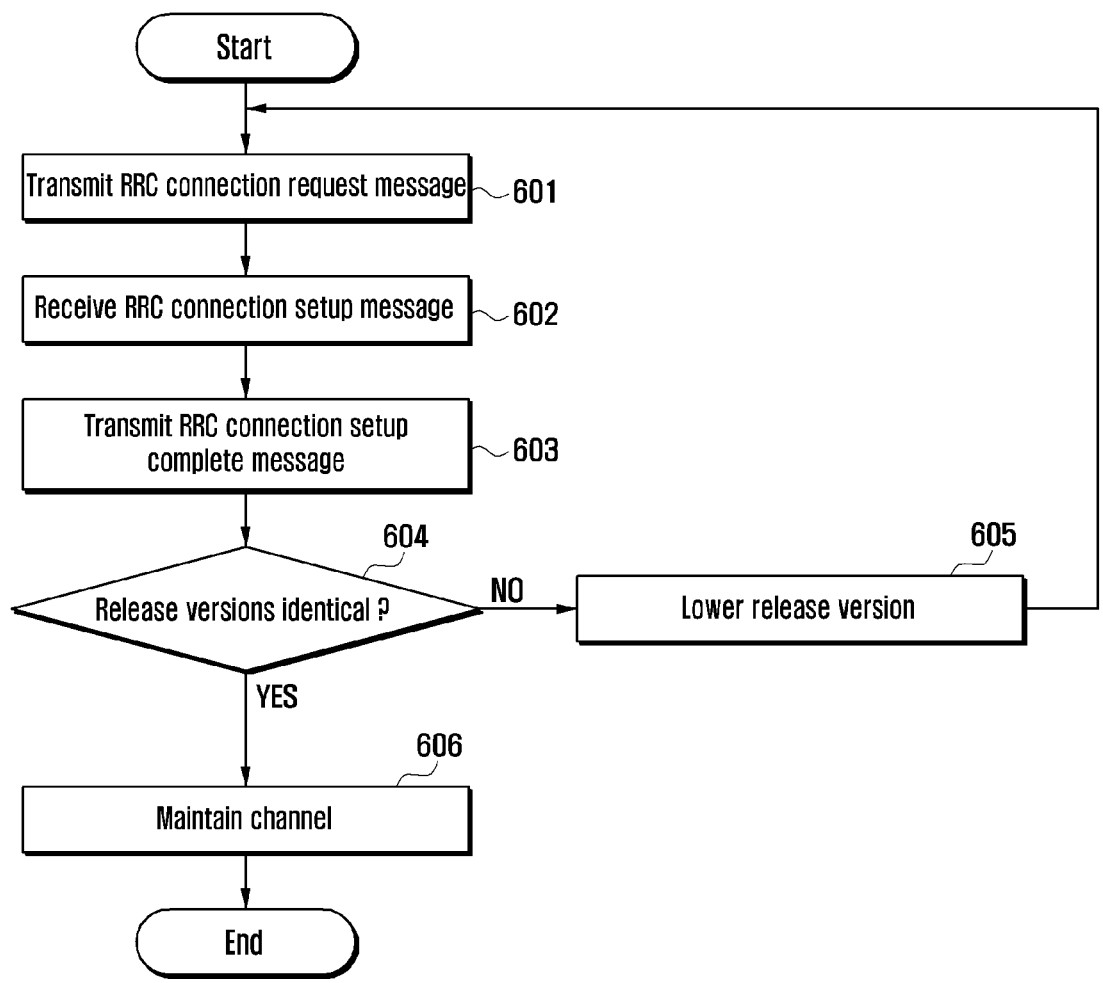
FIG. 6 is a flowchart illustrating a network connecting method achieved by a UE according to the second exemplary embodiment of the present invention.

FIG. 6 is a flowchart illustrating a network connecting method achieved by a UE according to the second exemplary embodiment of the present invention.

Referring to FIG. 6, a controller 140 controls a message transceiver 110 to transmit an RRC connection request message to a network 200 in step 601. The controller 140 receives an RRC connection setup message from the network 200 through the message transceiver 110 in step 602. Step 601 and step 602 are substantially the same as step 401 and step 402 of FIG. 4, respectively. It is assumed that a release version 'REL-7' is included in the RRC connection request message, and a release version 'REL-5' is included in the RRC connection setup message.

The controller 140 controls the message generator 120 to generate the RRC connection setup complete message and controls the message transceiver 110 to transmit the generated RRC connection setup complete message to the network in step 603. When a release version 'REL-5' is included in the RRC connection setup message, the controller 140 controls the message generator 120 to add the release version 'REL-5', thereby generating an RRC connection setup complete message, and controls the message transceiver 110 to transmit the generated RRC connection setup complete message to the network 200. Accordingly, an RRC connection procedure of the UE 100 is terminated and then a channel of a release version 'REL-5' is formed between the UE 100 and the network 200.

Subsequently, the controller 140 determines whether a release version included in an RRC connection setup message is identical with that included in an RRC connection request message in step 604. If the release version included in the RRC connection request message is 'REL-7' and the release version included in the RRC connection setup message is 'REL-5', the controller 140 determines that the two release versions differ from each other. In that case, the controller 140 lowers a release version in step 605, returns to step 601, controls the message generator 120 to add the lowered release version, thereby generating an RRC connection request message, and controls the message transceiver 110 to transmit the generated RRC connection request message to the network 200. It is assumed that the controller 140 lowers the release version from 'REL-7' to 'REL-6', controls the message generator 120 to add the release version 'REL-6', by generating an RRC connection request message, and controls the message transceiver 110 to transmit the generated RRC connection request message to the network 200.

If the controller 160 receives an RRC connection setup message with the release version 'REL-6' through the message transceiver 110 at step 602, it controls the message generator 120 to add the 'REL-6', thereby generating the RRC connection setup complete message, and controls the message transceiver 110 to transmit the generated RRC connection setup complete message to the network 200 in step 603.

If the controller 140 determines that the release version included in the RRC connection request message is identical with the release version included in the RRC connection setup message in step 604, the controller maintains a channel formed with the network 200 in step 606.

In the second exemplary embodiment, the UE 100 forms a channel according to the release version provided from the network 200, and continuously lowers a release version until the release version included in the RRC connection request message becomes identical with the release version included in the RRC connection setup message to generate an RRC connection request message. As a result, the UE 100 may connect with the network 200 by a high-performance channel.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for connecting to a network from a mobile terminal, the method comprising:

transmitting, by the mobile terminal, a Radio Resource Control (RRC) connection request message indicating a first release version to the network;
receiving an RRC connection setup message indicating a second release version from the network;
comparing the second release version with the first release version;
determining whether there is a third release version lower than the first release version and higher than the second release version when the second release version differs from the first release version; and
if the third release version exists and is lower than the first release version and higher than the second release version, transmitting an RRC connection request message indicating the third release version to the network when the second release version differs from the first release version.

2. The method of claim 1, further comprising transmitting an RRC connection setup complete message indicating the first release version to the network when the second release version does not differ from the first release version.

3. The method of claim 1, further comprising:
receiving an RRC connection setup message indicating a fourth release version from the network;
comparing the fourth release version with the third release version; and
transmitting an RRC connection setup complete message indicating the third release version to the network when the fourth release version does not differ from the third release version.

4. The method of claim 1, further comprising:
if the third release version lower than the first release version and higher than the second release version does not exist, transmitting an RRC connection setup complete message indicating the second release version to the network when the second release version differs from the first release version.

5. The method of claim 1, wherein the transmitting of the RRC connection request message indicating the third release version comprises:
selecting a highest release version among a plurality of release versions when the plurality of release versions exist and are each lower than the first release version and higher than the second release version;
generating the RRC connection request message indicating the third release version with the selected highest release version; and
transmitting the RRC connection request message indicating the third release version with the selected highest release version to the network.

6. The method of claim 1, further comprising transmitting an RRC connection setup complete message with the second release version to the network before the comparing of the second release version with the first release version.

7. A method for connecting to a network from a mobile terminal, the method comprising:

transmitting, by the mobile terminal, a Radio Resource Control (RRC) connection request message indicating a first release version to the network;
receiving an RRC connection setup message indicating a second release version from the network;
comparing the second release version with the first release version;
transmitting an RRC connection setup complete message to the network;
determining whether there is a third release version lower than the first release version and higher than the second release version when the second release version differs from the first release version; and
if the third release version exists and is lower than the first release version and higher than the second release version, transmitting an RRC connection request message indicating the third release version to the network when the second release version differs from the first release version.

8. The method of claim 7, further comprising:
receiving an RRC connection setup message indicating a fourth release version from the network;
comparing the fourth release version with the third release version; and
transmitting an RRC connection setup complete message indicating the third release version to the network when the fourth release version does not differ from the third release version.

9. The method of claim 7, wherein the transmitting of the RRC connection setup complete message comprises transmitting an RRC connection setup complete message indicating the first release version to the network when the second release version does not differ from the first release version.

10. The method of claim 7, further comprising:
if the third release version lower than the first release version and higher than the second release version does not exist, transmitting an RRC connection setup complete message indicating the second release version to the network when the second release version differs from the first release version.

11. The method of claim 7, wherein the transmitting of the RRC connection request message indicating the third release version comprises:
selecting a highest release version among a plurality of release versions when the plurality of release versions exist and are each lower than the first release version and higher than the second release version;
generating the RRC connection request message indicating the third release version with the selected highest release version; and
transmitting the RRC connection request message indicating the third release version with the selected highest release version to the network.

12. The method of claim 7, wherein the transmitting of the RRC connection setup complete message is performed before the comparing of the second release version with the first release version.

* * * * *